US009582168B2

(12) United States Patent
Lee et al.

(10) Patent No.: US 9,582,168 B2
(45) Date of Patent: Feb. 28, 2017

(54) APPARATUS, METHOD AND COMPUTER READABLE RECORDING MEDIUM FOR DISPLAYING THUMBNAIL IMAGE OF PANORAMIC PHOTO

(71) Applicant: Samsung Electronics Co., Ltd., Suwon-si, Gyeonggi-do (KR)

(72) Inventors: Woo-Yong Lee, Seoul (KR); Kyung-Heum Yi, Suwon-si (KR); Myung-Woo Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 255 days.

(21) Appl. No.: 14/252,072

(22) Filed: Apr. 14, 2014

(65) Prior Publication Data

US 2014/0351763 A1    Nov. 27, 2014

(30) Foreign Application Priority Data

May 21, 2013    (KR) ........................ 10-2013-0057179

(51) Int. Cl.
*G06F 3/048*    (2013.01)
*G06F 3/0484*    (2013.01)
(Continued)

(52) U.S. Cl.
CPC ......... *G06F 3/04845* (2013.01); *G03B 37/00* (2013.01); *H04N 5/23238* (2013.01);
(Continued)

(58) Field of Classification Search
CPC ........ G03B 37/00; G03B 37/02; G03B 37/04; G06F 3/0481–3/04845; H04N 5/23238;
(Continued)

(56) References Cited

U.S. PATENT DOCUMENTS 8,120,641 B2    2/2012  Kang et al.
2007/0253698 A1*  11/2007  Park ...................... G03B 37/00
                                                              396/296

(Continued)

FOREIGN PATENT DOCUMENTS

JP    2002-158922 A    5/2002
KR    10-2007-0006335 A    1/2007
(Continued)

*Primary Examiner* — Claudia Dragoescu
(74) *Attorney, Agent, or Firm* — Jefferson IP Law, LLP

(57) ABSTRACT

An apparatus for displaying a thumbnail of a panoramic photo is provided. The apparatus includes a camera configured to capture a photo in a panorama photography mode, a controller configured to control a thumbnail image to be created by reducing the panoramic photo shot by the camera module by a predetermined first factor, and a display unit configured to display the thumbnail image on a screen. The controller controls the thumbnail image to be updated by further reducing the thumbnail image by a second factor to fit in a displayable screen range of the display unit if a width of the thumbnail image exceeds the displayable screen range as a shooting angle of the panoramic photo shot by the camera module increases, and controls the updated thumbnail image to be displayed on the screen.

33 Claims, 18 Drawing Sheets

(51) Int. Cl.
*G03B 37/00* (2006.01)
*H04N 5/232* (2006.01)
*H04M 1/725* (2006.01)
*G03B 37/02* (2006.01)

(52) U.S. Cl.
CPC ......... *H04N 5/23293* (2013.01); *G03B 37/02* (2013.01); *H04M 1/72522* (2013.01); *H04M 2250/52* (2013.01)

(58) Field of Classification Search
CPC ........... H04N 5/23293; H04N 5/23216; H04N 5/2628
See application file for complete search history.

(56) References Cited

U.S. PATENT DOCUMENTS

| | | | |
|---|---|---|---|
| 2008/0192125 A1 | 8/2008 | Kang et al. | |
| 2011/0110605 A1* | 5/2011 | Cheong | H04N 5/23238 382/284 |
| 2011/0242274 A1* | 10/2011 | Yamaji | G06T 3/4038 348/36 |
| 2012/0182445 A1 | 7/2012 | You et al. | |
| 2012/0293611 A1* | 11/2012 | Lee | H04N 5/23238 348/36 |
| 2012/0300023 A1* | 11/2012 | Lee | H04N 5/23238 348/36 |

FOREIGN PATENT DOCUMENTS

| KR | 10-2008-0075954 A | 8/2008 |
|---|---|---|
| KR | 10-2011-0052124 A | 5/2011 |
| KR | 10-2012-0083085 A | 7/2012 |
| KR | 10-2013-0024357 A | 3/2013 |

\* cited by examiner

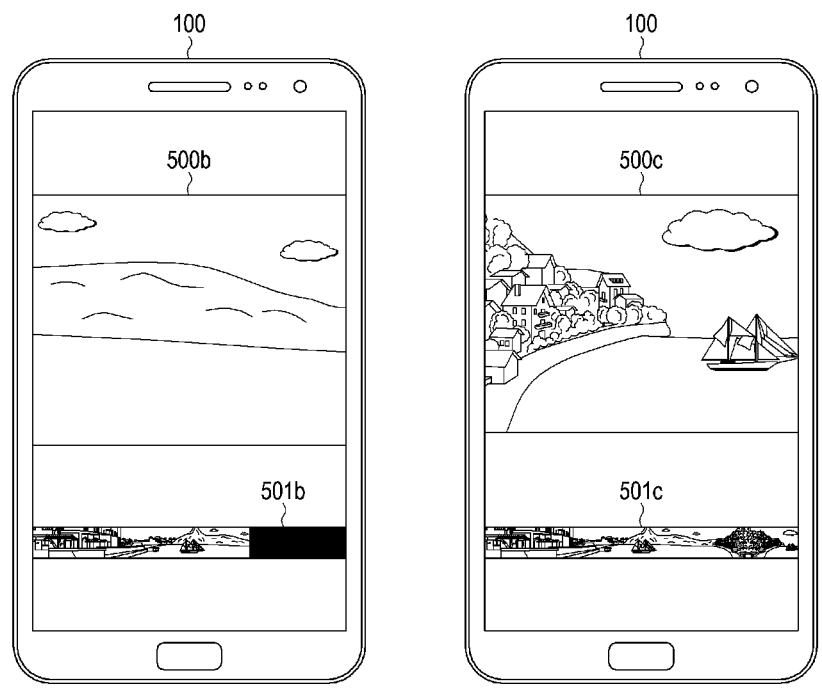
FIG.5B
(RELATED ART)
FIG.5C
(RELATED ART)
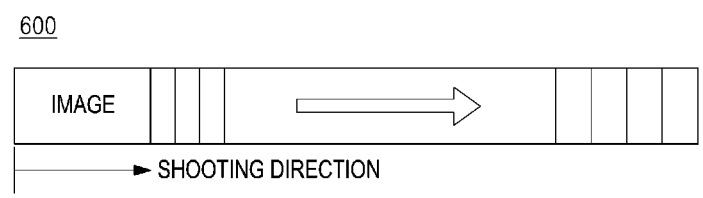
FIG.6

APPARATUS, METHOD AND COMPUTER READABLE RECORDING MEDIUM FOR DISPLAYING THUMBNAIL IMAGE OF PANORAMIC PHOTO

CROSS-REFERENCE TO RELATED APPLICATION(S)

This application claims the benefit under 35 U.S.C. §119(a) of a Korean patent application filed on May 21, 2013 in the Korean Intellectual Property Office and assigned Serial No. 10-2013-0057179, the entire disclosure of which is hereby incorporated by reference.

TECHNICAL FIELD

The present disclosure relates to an electronic device. More particularly, the present disclosure relates to an apparatus, method, and computer-readable recording medium for displaying a thumbnail of a panoramic photo shot by a camera module of an electronic device.

BACKGROUND

Mobile devices such as smartphones provide growing number of services and optional functionalities as well as provide corresponding touchscreen-based Graphic User Interfaces (GUIs). To improve usefulness of the mobile device and meet different desires of users, various practical applications to run in the mobile devices have been developed.

The mobile device may store and run default applications installed at a manufacturing stage and optional applications downloaded on the Internet from application sales sites. Optional applications may be developed by general developers and registered in the sales websites.

As the mobile devices' functions have become more diversified, smartphones equipped with camera modules as default have been released. Many applications with various camera-related functions are also provided.

One of the camera-related functions is a panorama photography function. The panorama photography function is a shooting technique to capture a wide scene by moving the capturing device such as a camera or a mobile device from side to side or up and down. A panoramic photo resulting from panorama shooting usually has a relatively wide aspect ratio.

In panorama shooting or viewing a panoramic photo, a thumbnail image reduced from the entire panoramic photo is provided as a preview image in somewhere in the panoramic photo screen, typically on the lower side of the screen.

However, in case of providing an original panoramic image 400 with an elongated shooting angle as a thumbnail image, the thumbnail image is reduced to a size so small that its visibility is poor. This leads to low usability of the preview functionality through the thumbnail image.

Therefore, a need exists for a method of efficiently displaying a panoramic photo's thumbnail image on the screen in panorama photography mode or in viewing a panoramic photo in an electronic device with a camera module, e.g., a camera, a cell phone a smartphone, etc.

The above information is presented as background information only to assist with an understanding of the present disclosure. No determination has been made, and no assertion is made, as to whether any of the above might be applicable as prior art with regard to the present disclosure

SUMMARY

Aspects of the present disclosure are to address at least the above-mentioned problems and/or disadvantages and to provide at least the advantages described below. Accordingly, an aspect of the present disclosure is to provide an apparatus, method and computer-readable recording medium for displaying a thumbnail image of a panoramic photo captured by a camera module of an electronic device, including operations of displaying a thumbnail image on the screen by reducing the panoramic photo by a predetermined factor and adjusting the reduction factor of the thumbnail image as the size of the panoramic photo increases.

Another aspect of the present disclosure is to provide an apparatus, method, and computer-readable recording medium for displaying a thumbnail image of a panoramic photo captured by a camera module of an electronic device, including operations of displaying a thumbnail image on the screen by reducing the panoramic photo by a predetermined factor, and if the thumbnail image does not fit the screen as the size of the panoramic photo increases, further reducing the thumbnail image to fit the screen.

Another aspect of the present disclosure is to provide an apparatus, method and computer-readable recording medium for displaying a thumbnail image of a panoramic photo captured by a camera module of an electronic device, including operations of displaying a thumbnail image on the screen by reducing the panoramic photo by a predetermined factor and adjusting the reduction factor of the thumbnail image as the size of the panoramic photo increases.

Another aspect of the present disclosure is to provide an apparatus, method and computer-readable recording medium for displaying a thumbnail image of a panoramic photo captured by a camera module of an electronic device, including operations of displaying a thumbnail image on the screen by reducing the panoramic photo by a predetermined first factor, if the thumbnail image does not fit the screen as the size of the panoramic photo increases, further reducing the thumbnail image to fit the screen, and as the size of the panoramic photo increases more, if a reduction factor by which to reduce the thumbnail exceeds a second factor, shifting the thumbnail image on the screen to display a newly added part on the screen.

In accordance with an aspect of the present disclosure, an apparatus for displaying a thumbnail of a panoramic photo is provided. The apparatus includes a camera configured to capture a photo in a panorama photography mode, a controller configured to control a thumbnail image to be created by reducing the panoramic photo shot by the camera by a predetermined first factor, and a display unit configured to display the thumbnail image on a screen, wherein the controller controls the thumbnail image to be updated by further reducing the thumbnail image by a second factor to fit in a displayable screen range of the display unit if a width of the thumbnail image exceeds the displayable screen range as a shooting angle of the panoramic photo shot by the camera increases, and controls the updated thumbnail image to be displayed on the screen.

According to another aspect of the present invention, the display unit may further display the panoramic photo on the screen.

According to another aspect of the present invention, the display unit may further display the thumbnail image having a wide aspect ratio on an upper or lower side of the screen.

According to another aspect of the present invention, the display unit may display the thumbnail image having a long aspect ratio on a left or right side of the screen.

According to another aspect of the present invention, the controller may control the thumbnail image to be updated at a predetermined cycle.

According to another aspect of the present invention, the display unit may display a thumbnail image corresponding to a panorama photo selected from among panorama photos stored in a storage as being reduced by the second factor.

In accordance with another aspect of the present disclosure, an apparatus for displaying a thumbnail of a panoramic photo is provided. The apparatus includes a camera configured to capture a photo in a panorama photography mode, a controller configured to control a thumbnail image to be created by reducing the panoramic photo shot by the camera by a predetermined factor, and a display unit configured to display the thumbnail image on a screen, wherein the controller controls the thumbnail image to be shifted in an opposite direction of a shooting direction if a width of the thumbnail image exceeds a displayable screen range of the display unit as a shooting angle of the panoramic photo shot by the camera increases such that an image added as the shooting angle increases is further displayed on the screen.

In accordance with another aspect of the present disclosure, an apparatus for displaying a thumbnail of a panoramic photo is provided. The apparatus includes a camera configured to capture a photo in a panorama photography mode, a controller configured to control a thumbnail image to be created by reducing the panoramic photo shot by the camera module by a predetermined first factor, and a display unit configured to display the thumbnail image on a screen, wherein the controller controls the thumbnail image to be updated by further reducing the thumbnail image to fit in a displayable screen range of the display unit if a width of the thumbnail image exceeds the displayable screen range as a shooting angle of the panoramic photo shot by the camera increases, and controls the thumbnail image to be shifted in an opposite direction of a shooting direction if a factor by which to further reduce the thumbnail exceeds a predetermined reference factor as the shooting angle continues to increase, such that an image added as the shooting angle increases is further displayed on the screen.

In accordance with another aspect of the present disclosure, a method for displaying a thumbnail of a panoramic photo is provided. The method includes capturing a photo with a camera in a panorama photography mode, creating a thumbnail image by reducing the panoramic photo shot by the camera by a predetermined first factor, displaying the thumbnail image on a screen, updating the thumbnail image by further reducing the thumbnail image by a second factor to fit in a displayable screen range of the screen if a width of the thumbnail image exceeds the displayable screen range as a shooting angle of the panoramic photo shot by the camera module increases, and displaying the further reduced thumbnail image on the screen.

According to another aspect of the present invention, the method may further include displaying the panoramic photo on the screen.

According to another aspect of the present invention, the thumbnail image may be displayed to have a wide aspect ratio on an upper or lower side of the screen.

According to another aspect of the present invention, the thumbnail image may be displayed to have a long aspect ratio on a left or right side of the screen.

According to another aspect of the present invention, the thumbnail image may be updated at a predetermined cycle.

According to another aspect of the present invention, the method may further include displaying a thumbnail image corresponding to a panorama photo selected from among panorama photos stored in a storage as being reduced by the second factor.

In accordance with another aspect of the present disclosure, a method for displaying a thumbnail of a panoramic photo is provided. The method includes capturing a photo with a camera in a panorama photography mode, creating a thumbnail image by reducing the panoramic photo shot by the camera by a predetermined first factor, displaying the thumbnail image on a screen, shifting the thumbnail image in an opposite direction of a shooting direction if a width of the thumbnail image exceeds a displayable screen range of the screen as a shooting angle of the panoramic photo shot by the camera module increases such that an image added as the shooting angle increases is further displayed on the screen.

In accordance with another aspect of the present disclosure, a method for displaying a thumbnail of a panoramic photo is provided. The method includes capturing a photo with a camera in a panorama photography mode, creating a thumbnail image by reducing the panoramic photo shot by the camera by a predetermined first factor, displaying the thumbnail image on a screen, updating the thumbnail image by further reducing the thumbnail image to fit in a displayable screen range of the screen if a width of the thumbnail image exceeds the displayable screen range as a shooting angle of the panoramic photo shot by the camera module increases, displaying the further reduced thumbnail image on the screen, and shifting the thumbnail image in an opposite direction of a shooting direction if a factor by which to further reduce the thumbnail exceeds a predetermined reference factor as the shooting angle continues to increase, such that an image added as the shooting angle increases is further displayed on the screen.

According to another aspect of the present invention, computer-readable codes for executing the method for displaying a thumbnail image of a panoramic photo may be stored in a computer-readable recording medium.

The computer-readable recording medium includes any kind of recording medium having a computer-readable program and data embodied thereon.

The computer-readable recording medium is any data storage device that can store data which can be thereafter read by a computer system. Examples of the computer readable recording medium include Read-Only Memory (ROM), Random-Access Memory (RAM), Compact Disc (CD)-ROMs, magnetic tapes, floppy disks, optical data storage devices, etc. The computer readable recording medium can also be distributed over network coupled computer systems so that the computer readable code is stored and executed in a distributed fashion.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A, 5B, and 5C show screens displaying thumbnail images of general panoramic photos according to the related art;

FIG. 6 illustrates a concept of creating a panoramic photo according to an embodiment of the present disclosure;

Throughout the drawings, like reference numerals will be understood to refer to like parts, components, and structures.

DETAILED DESCRIPTION

Figure 1:
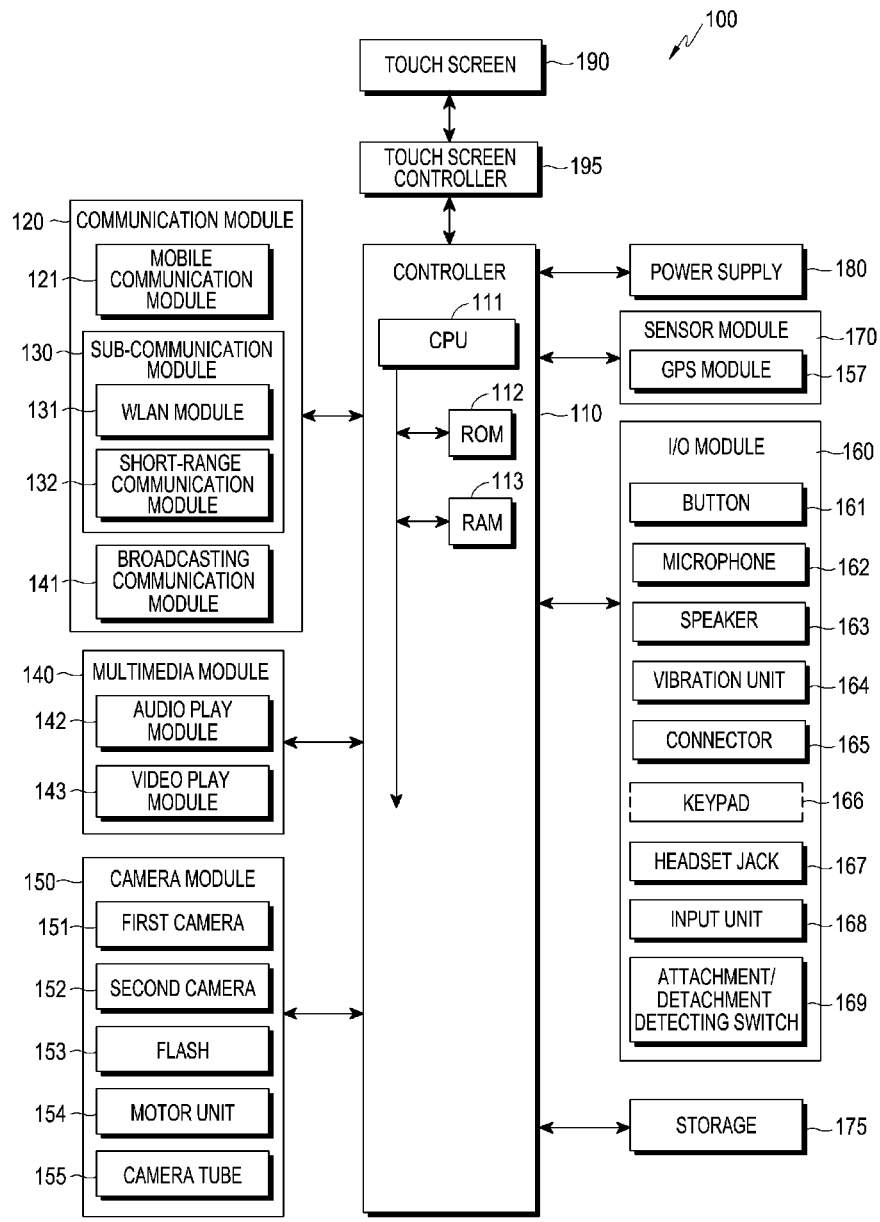
FIG. 1 is a schematic block diagram of a portable terminal as an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure.

Descriptions shall be understood as to include any and all combinations of one or more of the associated listed items when the items are described by using the conjunctive term "~and/or~," or the like.

The terminology used herein is for the purpose of describing particular embodiments only and is not intended to be limiting of the disclosure. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Various embodiments of the present disclosure discloses an apparatus and method for displaying a thumbnail image of a panoramic photo shot by a camera module of any electronic device (e.g., a digital camera, a cell phone, a smartphone, a tablet computer, etc.) on the screen.

In an embodiment of the present disclosure, a thumbnail image may be displayed by reducing the panoramic photo by a predetermined factor, and if the whole thumbnail image does not fit a displayable area of the screen as the size of the panoramic photo increases, further reducing the thumbnail image by a factor to fit the displayable area.

In another embodiment of the present disclosure, a thumbnail image may be displayed by reducing the panoramic photo by a predetermined factor, and if the whole thumbnail image does not fit a displayable area of the screen as the size of the panoramic photo increases, shifting the thumbnail image on the screen such that a newly added part of the thumbnail image is displayed on the screen.

In another embodiment of the present disclosure, the apparatus and method may be implemented by combining the aforementioned embodiments. For example, the thumbnail image may be displayed by reducing the thumbnail image by up to a certain factor, and if the reduction factor exceeds the certain factor, shifting the thumbnail image such that a newly added part of the thumbnail image is displayed on the screen.

In the following description of various embodiments of the present disclosure, a photo image captured in panorama photography mode will be referred to as a panoramic photo or panoramic photo image. An image to be displayed by reducing the panoramic photo by a predetermined factor to provide a preview of the panoramic photo will be referred to as a thumbnail image. An image reduced first from the panoramic photo will be referred to as an original thumbnail image. The panoramic photo is created by shooting a scene captured by the lens of the camera module of an electronic device in real time (e.g., at certain time intervals) while a photographer increases the shooting angle in the panorama photography mode. In other words, the panoramic photo is created by combining new images added when the photographer continues to take pictures by moving the lens from side to side or up and down with the image previously captured.

In the following embodiments of the present disclosure, an apparatus and method is provided for efficiently displaying a thumbnail image of a panoramic photo that has thus far been captured and created in the panorama photography mode or in viewing panoramic photos. The thumbnail image may be displayed on the screen independently or together with a partial image of the panoramic photo which is being captured now.

The apparatus and method may be implemented in an electronic device equipped with a camera module, the electronic device being any device that may provide the panorama photography functionality.

The electronic device may also be referred to as a camera, a portable terminal, a communication terminal, a portable communication terminal, a portable mobile terminal, etc. For example, the electronic device may be a digital camera, a smartphone, a cell phone, a game console, a television, a display device, a head unit for vehicle, a notebook computer, a laptop computer, a tablet computer, a Personal Media Player (PMP), a Personal Digital Assistant (PDA), a Global Positioning System (GPS) device, an Automated Teller Machine (ATM), a shop's Point Of Sale (POS), and the like. The electronic device may also be a flexible device or a flexible display device.

In various embodiments of the present disclosure, the portable device such as a cell phone, smartphone, etc. will be taken as a representative example of the electronic device, but some components of the portable device may be omitted or replaced.

FIG. 1 is a schematic block diagram of a portable terminal as an electronic device according to an embodiment of the present disclosure.

Referring to FIG. 1, the portable terminal 100 may be connected to an external electronic device (not shown) by using at least one of a communication module 120, a connector 165, and a headset jack 167. The "external electronic device" may include a variety of devices, such as earphones, external speakers, Universal Serial Bus (USB) memories, chargers, cradles/docks, Digital Multimedia Broadcasting (DMB) antennas, mobile payment related devices, health care devices (e.g., blood sugar testers), game consoles, vehicle navigations, or the like, which are removable from the portable terminal 100 and connected thereto via cable. The external electronic device may also include a Bluetooth communication device, a Near Field Communication (NFC) device, a Wireless Fidelity (Wi-Fi) Direct communication device, a wireless Access Point (AP). The portable terminal 100 may also be connected to one of any other portable devices or electronic devices, such as cell phones, smartphones, tablet PCs, desktop PCs and servers, wirelessly or via cable.

The portable terminal 100 may further include at least one touch screen 190 and at least one touch screen controller 195. The portable terminal 100 may also include a controller 110, the communication module 120, a multimedia module 140, a camera module 150, an input/output module 160, a sensor module 170, a storage 175, and a power supply 180. The communication module 120 may include a mobile communication module 121, a sub-communication module 130, and a broadcast communication module 141. The sub-communication module 130 may include at least one of Wireless Local Area Network (WLAN) 131 and a short-range communication module 132, and the multimedia module 140 may include at least one of an audio play module 142 and a video play module 143. The camera module 150 may include at least one of a first camera 151 or a second camera 152. The input/output module 160 may include at least one of a plurality of buttons 161, a microphone 162, a speaker 163, a vibration unit 164, the connector 165, and a keypad 166.

The controller 110 may include a Central Processing Unit (CPU) 111, a Read Only Memory (ROM) 112 for storing a control program to control the portable terminal 100, and a Random Access Memory (RAM) 113 for storing signals or data input from outside or for being used as a memory space for working results in the portable terminal 100. The CPU 111 may include a single core, dual cores, triple cores, or quad cores. The CPU 111, ROM 112, and RAM 113 may be connected to each other via an internal bus.

The controller 110 may control the communication module 120, the multimedia module 140, the camera module 150, the input/output module 160, the sensor module 170, the storage 175, the power supply 180, the touch screen 190, and the touch screen controller 195.

In various embodiments of the present disclosure, the controller 110 may control the camera module 150 to provide a panorama photography function as well as to display a thumbnail image of a captured panorama photo on the screen.

In various embodiments of the present disclosure, inputs to the controller 110 may include not only touch inputs to the touch screen 190 but also gesture inputs through the camera module 150, switch/button inputs through the button 161 or the keypad 166, voice inputs through the microphone 162, and the like.

The controller 110 may also detect an input unit 168 approaching the touch screen 190 or any other user input event, such as a hovering event that occurs when the user is hovering near the touch screen 190. When the user input event occurs, the controller 110 may control an application corresponding to the user input event to run.

The controller 110 may also detect various user inputs received not only through the touch screen 190 but also through the camera module 150, the input/output module 160, the sensor module 170, and the like. The user input may include different forms of information entered into the portable terminal 100, such as touches, user gestures, voice, pupil movements, iris recognition, vital signs, and the like. The controller 110 may control predetermined operations or functions to be performed in the portable terminal 100 in response to the user inputs.

The controller 110 may send control signals to the input unit 168 or the vibration unit 164. The control signals may include information about vibrating patterns and the input unit 168 or may control the vibration unit 164 to vibrate according to the vibrating patterns. The information about the vibrating patterns may represent vibrating patterns themselves, identification of the vibrating patterns, etc. Alternatively, the control signals may only include requests for vibration.

The portable terminal 100 may include at least one of the mobile communication module 121, the WLAN module 131 and the short range communication module 132 depending on its capability.

The mobile communication module 121 may connect the portable terminal 100 to an external electronic device through mobile communication using at least one—one or more—antennas (not shown) under control of the controller 110. The mobile communication module 121 may transmit/receive wireless signals for voice calls, video conference calls, Short Message Service (SMS) messages, or Multimedia Messaging Service (MMS) messages to/from a cell phone (not shown), a smart phone (not shown), a tablet PC (not shown), or another device not shown), the phones having phone numbers entered into the portable terminal 100.

The sub-communication module 130 may include at least one of the WLAN module 131 and the short-range communication module 132. For example, the sub-communication module 130 may include either the WLAN module 131 or the—short range communication module 132, or both.

The WLAN module 131 may be connected to the Internet in a place where there is a wireless AP (not shown), under control of the controller 110.

The WLAN module 131 may support Institute of Electrical and Electronic Engineers' (IEEE's) WLAN standard IEEE802.11x. The short range communication module 132 may conduct short range communication between the portable terminal 100 and an external electronic device under control of the controller 110. The short-range communication may include Bluetooth, infrared data association (IrDA), WiFi-Direct, Near Field Communication (NFC), and the like.

The broadcast communication module 141 may receive broadcast signals (e.g., television broadcast signals, radio broadcast signals, or data broadcast signals) and additional broadcast information (e.g., Electric Program Guide (EPG) or Electric Service Guide (ESG)) transmitted from a broadcasting station through a broadcast communication antenna (not shown), under control of the controller 110.

The multimedia module 140 may include the audio play module 142, or the video play module 143. The audio play module 142 may play digital audio files (e.g., files having extensions, such as mp3, wma, ogg, or way) stored in the storage 175 or received under control of the controller 110. The video play module 143 may play digital video files (e.g., files having extensions, such as mpeg, mpg, mp4, avi, move, or mkv) stored or received under control of the controller 110. The multimedia module 140 may be incorporated in the controller 110.

The camera module 150 may include at least one of the first and second cameras 151 and 152 for capturing still images, video images, or panorama photos under control of the controller 110. The camera module 150 may include at least one of a camera tube 155 for zooming in/out to capture an object, a motor unit 154 for controlling the movement of the camera tube 155, and a flash 153 for providing auxiliary light to capture an object. The first camera 151 may be placed on the front of the portable device 100 and the second camera 152 may be placed on the back of the portable device 100.

The input/output module 160 may include at least one button 161, the microphone 162, the speaker 163, the vibration unit 164, the connector 165, the keypad 166, the headset jack 167, and the input unit 168. However, the input/output module 160 is not limited to the aforementioned elements, and may also include a mouse, a trackball, a joystick, or a cursor control such as cursor direction keys to control the movement of the cursor on the touch screen 190.

The button 161 may be arranged on the front, side, or back of the housing (or the case) of the mobile device 100, and may include at least one of a power/lock button, a volume button, a menu button, a home button, a back button, and a search button. The microphone 162 may generate electric signals from voice or sound received, under control of the controller 110. The speaker 163 may output a sound corresponding to various signals or data (e.g., wireless data, broadcasting data, digital audio data, digital video data, etc.) under control of the controller 110. The speaker 163 may output sounds (e.g., button-press sounds, ringback tones, the other party's voice, and the like) that correspond to functions performed by the portable terminal 100. One or more speakers 163 may be arranged in a proper position or proper positions of the housing of the portable terminal 100.

The vibration unit 164 may convert an electric signal to a mechanical vibration under control of the controller 110. For example, the portable terminal 100 in a vibrating mode operates the vibrating motor when receiving a voice or video call from another device (not shown). One or more vibration units 164 may be installed inside the housing of the portable terminal 100. The vibration unit 164 may operate in response to user input through the touch screen 190.

The connector 165 may be used as an interface for connecting the portable terminal 100 to an external electronic device or a power source (not shown). The controller 110 may transmit or receive data stored in the storage 175 of the portable terminal 100 to or from the external electronic device via a cable connected to the connector 165. The portable terminal 100 may be powered from the power source via a cable connected to the connector 165 or may charge the battery using the power source.

The keypad 166 may receive key inputs from the user to control the portable terminal 100. The keypad 166 may include a physical keypad (not shown) formed in the portable terminal 100, or a virtual keypad (not shown) displayed on the touchscreen 190. The mechanical keypad formed in the terminal device 100 may be omitted depending on the performance or structure of the portable terminal 100. A headset may be connected to the portable terminal 100 by being plugged in the headset jack 167.

The input unit 168 may be inserted and kept in the portable terminal 100 and be drawn out and detached from the portable terminal 100. An attachment/detachment detecting switch 169 is installed within the portable terminal 100 to which the input unit 168 is inserted. The attachment/detachment detecting switch 169 operates according to attachment or detachment of the input unit 168 and sends the resulting signal to the controller 110. The attachment/detachment detecting switch 169 may be configured to make a direct or indirect contact with the input unit 168 when the input unit 168 is attached. Based on whether the attachment/detachment detecting switch 169 contacts the input unit 168, the attachment/detachment detecting switch 169 may generate a signal corresponding to attachment or detachment of the input unit 168, i.e., a signal notifying whether the input unit 168 is attached or detached, and send the signal to the controller 110.

The sensor module 170 includes at least one sensor for detecting a status of the portable terminal 100. For example, the sensor module 170 may include at least one of a proximity sensor for detecting proximity of a user to the portable terminal 100; an illumination sensor for detecting an amount of ambient light of the portable terminal 100; a motion sensor for detecting the motion of the portable terminal 100 (e.g., rotation of the portable terminal 100, acceleration or vibration applied to the portable terminal 100); a geomagnetic sensor for detecting a direction using the geomagnetic field; a gravity sensor for detecting a direction of gravity action; an altimeter for detecting an altitude by measuring atmospheric pressure; and the GPS module 157.

The GPS module 157 receives radio signals from a plurality of GPS satellites in Earth's orbit, and may calculate the position of the portable terminal 100 by using time of arrival from the GPS satellites to the portable terminal 100.

The storage 175 may store signals or data input/output according to operations of the communication module 120, the multimedia module 140, the camera module 150, the input/output module 160, the sensor module 170, or the touchscreen 190 under control of the controller 110. The storage 175 may store control programs and applications for controlling the portable terminal 100 or the controller 110. In various embodiments of the present disclosure, the control program or applications may control the camera module 150 to provide the panorama photography function and create a panoramic photo by combining consecutive images captured in real time in the panorama photography mode.

The control program or applications may also generate a thumbnail image for the panoramic photo by image processing the panoramic photo.

The term "storage" refers not only to the storage 175, but also any other data storage, such as the ROM 112, RAM 113 in the controller 110, or a memory card (e.g., an SD card, a memory stick) installed in the portable terminal 100. The storage 175 may also include a non-volatile memory, a volatile memory, a Hard Disc Drive (HDD), or a Solid State Drive (SSD).

The storage 175 may store many different functional applications, such as navigation systems, games, time-base alarming applications, and the like; images for Graphical User Interface (GUI) associated with the applications; databases related to user information; documents; methods for handling touch inputs, background images (e.g., menu screen, standby screen, etc.) needed to operate the portable terminal 100; operating programs; images captured by the camera module 150; or the like.

The storage 175 may also store a panoramic photo created under control of the controller 110 when several photos are taken by the camera module 150 in the panorama photography mode, and store a thumbnail image created from the panoramic photo. The panoramic photo or the thumbnail image stored in the storage 175 may be displayed by a display unit, e.g., on the touch screen 190. The storage 175 is a machine-readable (or computer-readable) medium, which may be defined as a medium for providing data for a machine to perform a particular function. The storage 175 may include non-volatile and volatile media. These media should be all tangible for a mechanical device to read out instructions embodied on the media.

The machine-readable media includes, but not exclusively, at least one of floppy disks, flexible disks, hard disc, magnetic tapes, Compact Disc Read-Only Memories (CD-ROMs), optical discs, punch cards, paper tapes, Random Access Memories (RAM), Programmable Read-Only Memories (PROM), Erasable PROM (EPROM), flash-EPROMs, embedded MultiMedia Cards (eMMCs).

The power supply 180 may supply power to one or more batteries placed inside the housing of the portable terminal 100, under control of the controller 110. The one or more batteries power the portable terminal 100. The power supply 180 may supply the portable terminal 100 with power input from the external power source via a cable connected to the connector 165. The power supply 180 may also supply the portable terminal 100 with wireless power from an external power source using a wireless charging technology.

The portable terminal 100 may have at least one touch screen 190 to provide GUIs for various services (e.g., call, data communication, broadcasting, photography and the like). The touchscreen 190 may send an analog signal corresponding to at least one user input to a GUI to the touchscreen controller 195. The user may select photography mode with the touch screen 190 and then select panorama photography mode while in the photography mode.

The touch screen 190 may receive at least one user input of the user's body part (e.g., digit including thumb) or the input unit 168 (e.g., a stylus pen, an electronic pen, etc.). The touch screen 190 may be implemented in e.g., a resistive manner, capacitive manner, infrared manner, acoustic wave manner, or a combination thereof.

The touch screen 190 may also include at least two touch panels each detecting proximity or touches of a digit or the input unit 168 to receive inputs of the digit or the input unit 168, respectively. The at least two touchscreen panels provide different output values to the touch screen controller 195, and the touch screen controller 195 may distinguish inputs made by the digit from inputs made by the input unit through the touch screen 190 by differently recognizing the values input from the at least two touch screen panels.

The touches are not limited to physical touches by a physical contact of the user or contacts with the touchable input means, but may also include touchless (e.g., keeping a detectable distance less than 1 mm between the touch screen 190 and the user's body or touchable input means). The detectable distance from the touch screen 190 may vary depending on the performance or structure of the portable terminal 100.

The touch screen controller 195 converts an analog signal input from the touch screen 190 to a digital signal and sends the digital signal to the controller 110. The controller 110 may control the touch screen 190 by using the digital signal received from the touch screen controller 195. The touch screen controller 195 may determine not only where the user input is made but also a hovering distance by detecting a value (e.g., a current value) output through the touch screen 190, convert the determined distance to a digital signal (e.g., in Z coordinate), and provide the digital signal to the controller 110. Furthermore, the touch screen controller 195 may detect pressure of the user input means on the touch screen 190 by detecting a value (e.g., a current value) output through the touch screen 190, convert the detected pressure to a digital signal, and provide the digital signal to the controller 110.

Figure 2:
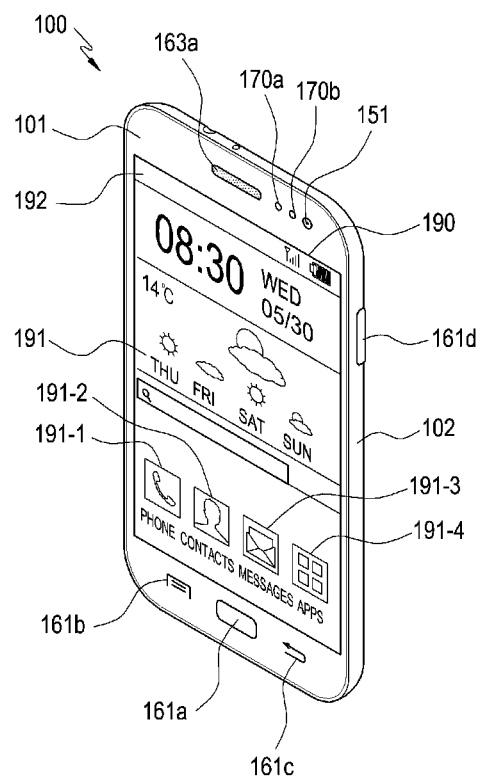
FIG. 2 is a perspective view of the front face of a portable terminal, according to an embodiment of the present disclosure.
Figure 3:
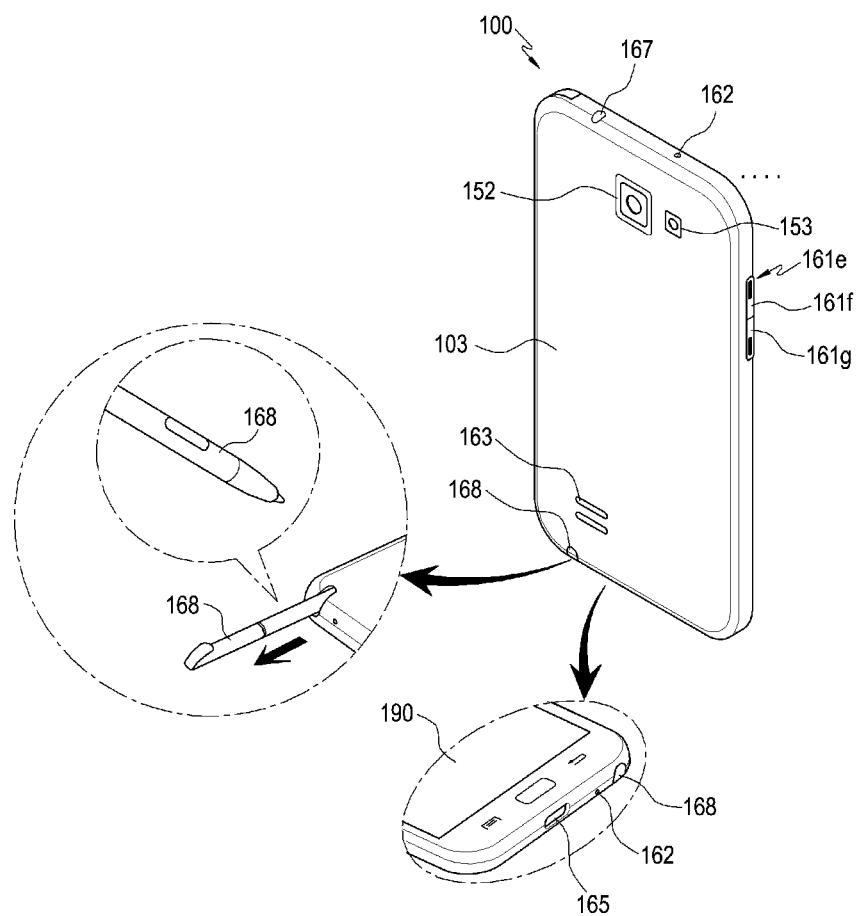
FIG. 3 is a perspective view of the back face of a portable terminal, according to an embodiment of the present disclosure.

FIG. 2 is a perspective view of the front face of a portable terminal, according to an embodiment of the present disclosure, and FIG. 3 is a perspective view of the back face of a portable terminal, according to an embodiment of the present disclosure.

Referring to FIGS. 2 and 3, the touch screen 190 is arranged in the middle of the front face 101 of the portable terminal 100.

The touch screen 190 may be formed to take up a major portion of the front face 101 of the portable terminal 100. In FIG. 2, the touch screen 190 displays a main home screen. The main home screen is a first screen to be displayed on the touch screen 190 when the portable terminal 100 is powered on.

When the portable terminal 100 has several pages of different home screens, the main home screen may be the first of the several pages of home screens. Shortcut icons 191-1, 191-2, 191-3 for running frequently-used applications, a main menu key 191-4, a time indicator, a weather indicator, etc. may be displayed on the main home screen. If the user selects the main menu key 191-4, a menu screen is displayed on the touch screen 190. A status bar 192 in which to display statuses of the portable terminal 100, such as a battery charging state, intensity of received signals, current time, and the like may be displayed on an upper part of the touch screen 190.

In various embodiments of the present disclosure, when a panorama photography mode is selected from among various camera-related functions, a photo image being currently captured may be displayed on somewhere of the touch screen 190 and a thumbnail image created by reducing a panoramic photo may further be displayed on a dedicated area of the touch screen 190.

A home button 161a, a menu button 161b, and a back button 161c may be arranged in a lower part of the touch screen 190. The home button 161a displays the main home screen on the touch screen 190. For example, if the home button 161a is selected while any home screen other than the main home screen or a menu screen is displayed in the touch screen 190, the main home screen may be displayed on the touch screen 190. Furthermore, while applications are running on the touch screen 190, if the home button 161a is selected, the main home screen, as shown in FIG. 2, may be displayed on the touch screen 190. The home button 161a may also be used to display recently used applications or a task manager on the touch screen 190.

The menu button 161b provides a link menu that may be displayed on the touch screen 190. The link menu may include a widget addition menu, background change menu, search menu, edit menu, environment setting menu, etc.

The back button 161c may be used to display a screen that was displayed right before a current screen or stop a most recently used application.

The first camera 151, the illumination sensor 170a, and the proximity sensor 170b may be placed on the edge of the front face 101 of the portable terminal 100. The second camera 152, the flash 153, and the speaker 163 may be placed on the back face 103 of the portable terminal 100.

A power/reset button 161d, a volume button 161e including a volume up button 161f and a volume down button 161g, a terrestrial DMB antenna for broadcast reception, one or more microphones 162, and the like. may be placed on the side 102 of the portable terminal 100. The DMB antenna may be fixed to the portable terminal 100, or be detachably arranged.

The connector 165 is disposed on the lower side of the portable terminal 100. The connector 165 has a number of electrodes and may be connected to an external device via a cable. The headset jack 167 may be disposed on the upper side of the portable terminal 100. The headset jack 167 may receive a headset.

The input unit 168 may be arranged on the lower side of the portable terminal 100. The input unit 168 may be inserted and kept inside of the portable terminal 100 and be drawn out and detached from the portable terminal 100 for use.

Various embodiments of the present disclosure of an apparatus and method for displaying a thumbnail image of a panoramic photo are described below with reference to FIGS. 6 to 10. However, prior to describing the various embodiments of the present disclosure, a method for displaying a thumbnail according to the related art will be first described in connection with FIGS. 4 and 5.

Figure 4:
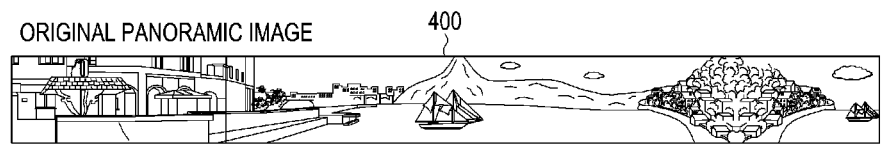
FIG. 4 shows an original panoramic photo image captured by a camera module according to the related art.
Figure 5A:
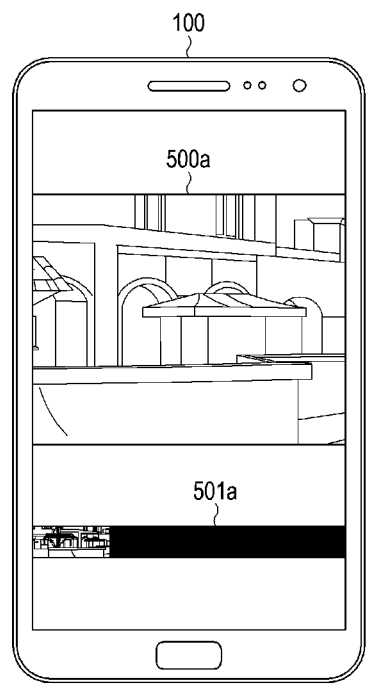

FIG. 4 shows an original panoramic photo image captured by a camera module according to the related art, and FIGS. 5A to 5C show a portable terminal's screens with thumbnail images of general panoramic photos according to the related art.

Referring to FIG. 4, an original panoramic photo 400 (or an original panoramic image) is created as a photo having wide aspect ratio. When the user selects the panorama photography mode in the portable terminal 100 and starts shooting, images captured by the lens of the camera module 150 in real time or at certain intervals, e.g., at a predetermined frequency per second are shot. As the user moves the portable terminal 100 from side to side, a newly captured image is combined with the previous shot image, and a final combined image becomes the original panoramic photo having wide aspect ratio.

Referring to FIGS. 5A to 5C, images 500a, 500b, and 500c shot in real time are displayed in large size at a particular area of the screen, e.g., the middle area of the screen. At this time, a panoramic photo created by consecutively combining the photographed images 500a, 500b, and 500c is stored in the storage, and thumbnail images 501a, 501b, and 501c created by reducing the panoramic photo are displayed in small size at a different area of the screen, e.g., a lower part of the screen.

According to the related art as described above in connection with FIGS. 5A to 5C, an area to display a thumbnail image is set up to be reduced in proportion to the aspect ratio of the panoramic photo by taking into account a maximum shooting angle of a panoramic photo to be created finally.

As panorama shooting starts and the shooting angle of a panoramic photo increases, a newly captured image is added to the previous panoramic photo and the added image is also reflected on the corresponding thumbnail image for display.

In such a case of setting up the thumbnail image area in advance by taking into account the maximum shooting angle of a panoramic photo, horizontal or vertical length of the area is significantly increased and the thumbnail image to be displayed in the area may be viewed as having a significantly small size. As such, the method according to the related art may not provide the thumbnail well to the user.

FIG. 6 illustrates a concept of creating a panoramic photo according to an embodiment of the present disclosure.

Referring to FIG. 6, when a user starts shooting a panoramic photo in the panorama photography mode and moves his/her portable terminal 100, which may also be a digital camera, a smartphone, or the like, from side to side, a panoramic photo 600 is created by combining a newly captured image in the shooting direction with the previously captured image(s). This method of creating the panoramic photo 600 may be implemented in various ways. For example, panoramic photos are not limited to those having wide aspect ratio but may also include photos having long aspect ratio which may be created by moving the portable terminal 100 up and down.

Shooting interval at which to shoot photos in order to create the panoramic photo 600 may be determined is diverse fashions. For example, the shooting interval may be determined to be a predetermined cycle (e.g., 15 times per second), so that 15 photos may be shot consecutively each second. A large panoramic image may be created by identifying overlapping parts between the photo images shot consecutively, and joining the photo images together according to the overlapping parts. The shape of the panoramic photo is not limited to a horizontally elongated shape as shown in FIG. 6, but may be a vertically elongated shape.

Various embodiments of the present disclosure are described below with reference to FIGS. 7 to 10.

Figure 7:
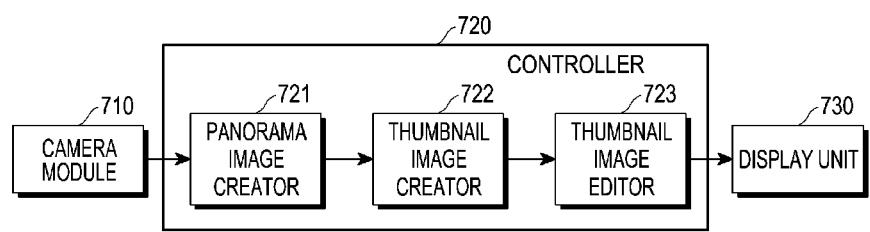
FIG. 7 is a block diagram of an apparatus for displaying a thumbnail image of a panoramic photo, according to an embodiment of the present disclosure.

FIG. 7 is a block diagram of an apparatus for displaying a thumbnail image of a panoramic photo, according to an embodiment of the present disclosure.

Referring to FIG. 7, the apparatus 700 may include a camera module 710, a controller 720, and a display unit 730. Each of the elements of the apparatus 700 may correspond to at least one particular element of the portable terminal 100 of FIG. 1.

The controller 720 may include a panoramic image creator 721, a thumbnail image creator 722, a thumbnail image editor 723.

The panoramic image creator 721 creates a panoramic photo or panoramic image by image processing photo images shot by the camera module 710 in the panorama photography mode e.g., in a way as described above. The method of creating a panoramic image in the panoramic image creator 721 may be diversely implemented.

The thumbnail image creator 722 creates a thumbnail image by reducing an original panoramic photo created by the panoramic image creator 722 by a predetermined factor. The thumbnail image may be displayed with (a part of) the panoramic photo by the display unit 730.

The thumbnail image editor 723 edits the thumbnail image according to various embodiments of the present disclosure, if the whole thumbnail image, which is reduced by the predetermined factor, is unable to be displayed in the screen of the display unit 730. For example, if the entire thumbnail image reduced with the predetermined factor is unable to be displayed in the screen of the display unit 730, the thumbnail image editor 723 further reduces the thumbnail image so as to be displayed on the screen of the display unit 730. The display unit 730 displays the thumbnail image further reduced.

In another embodiment of the present disclosure, if the entire thumbnail image reduced by the predetermined factor is unable to be displayed in the screen of the display unit 730, the thumbnail image editor 723 shifts the thumbnail image to display a part newly added to the thumbnail image in the screen. The display unit 730 displays the shifted thumbnail image with the newly added part.

Although the elements of the apparatus 700 are represented separately in FIG. 7, the elements need not necessarily be separated physically nor implemented as separate codes.

A functional unit as may be used herein is to be understood as a combination of hardware and software to drive the hardware to implement various embodiments of the present disclosure. For example, the functional unit may refer to, not exclusively, a code or a logical unit of a hardware resource for carrying out the code.

Figure 8:
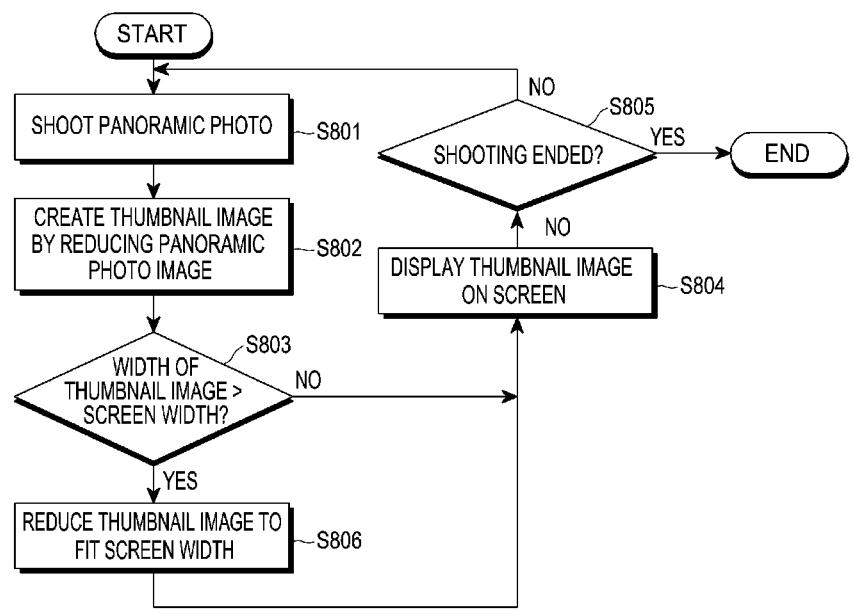
FIG. 8 is a flowchart illustrating a process of displaying a thumbnail image of a panoramic photo, according to an embodiment of the present disclosure.

FIG. 8 is a flowchart illustrating a process of displaying a thumbnail image of a panoramic photo, according to an embodiment of the present disclosure.

Referring to FIG. 8, when panoramic photo shooting is started in the panorama photography mode in operation S801, a panoramic photo is created from images shot as the user moves the electronic device from side to side or up and down.

A thumbnail image is created by reducing the panoramic photo by a predetermined factor (hereinafter referred to as a first factor), in operation S802. If the width of the thumbnail image does not exceed a displayable screen width in the screen in operation S803, the entire thumbnail image reduced with the first factor, is displayed on the screen in operation S804.

As the panorama shooting continues and the shooting angle increases, if the width of the thumbnail image reduced by the first factor exceeds the displayable screen width in the screen in operation S803, the thumbnail image is further reduced by another factor (hereinafter referred to as a second factor) to fit the displayable screen width in operation S806. The further reduced thumbnail image is displayed in the displayable screen, in operation S804. The aforementioned operations may be repeated until the panorama shooting ends in operation S805.

Figure 9:
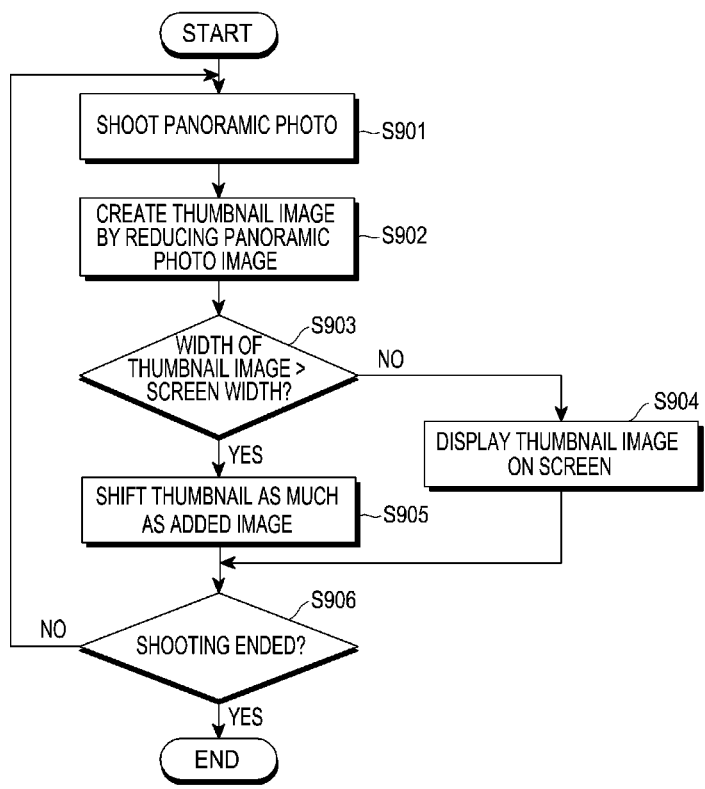
FIG. 9 is a flowchart illustrating a process of displaying a thumbnail image of a panoramic photo, according to an embodiment of the present disclosure.

FIG. 9 is a flowchart illustrating a process of displaying a thumbnail image of a panoramic photo, according to another embodiment of the present disclosure.

Referring to FIG. 9, when panoramic photo shooting is started in the panorama photography mode in operation S901, a panoramic photo is created from images shot as the user moves the electronic device from side to side or up and down.

A thumbnail image is created by reducing the panoramic photo by a predetermined factor, in operation S902. If the width of the thumbnail image does not exceeds a displayable screen width in the screen in operation S903, the entire thumbnail image reduced first by the predetermined factor is displayed on the screen in operation S904.

As the panorama shooting continues and the shooting angle increases, if the width of the thumbnail image reduced first by the predetermined factor exceeds the displayable screen width in the screen in operation S903, the thumbnail image is displayed by being shifted as much as a width of a newly added image to the thumbnail image (e.g., a width of a new image added to the right of the thumbnail image) in a certain direction (e.g., in the left direction if the user moves the portable terminal 100 from left to right to shoot the panoramic photo) in operation S905. By doing this, the newly added image may be displayed on the screen as the panorama shooting continues. The aforementioned steps may be repeated until the panorama shooting ends in operation S906.

Figure 10:
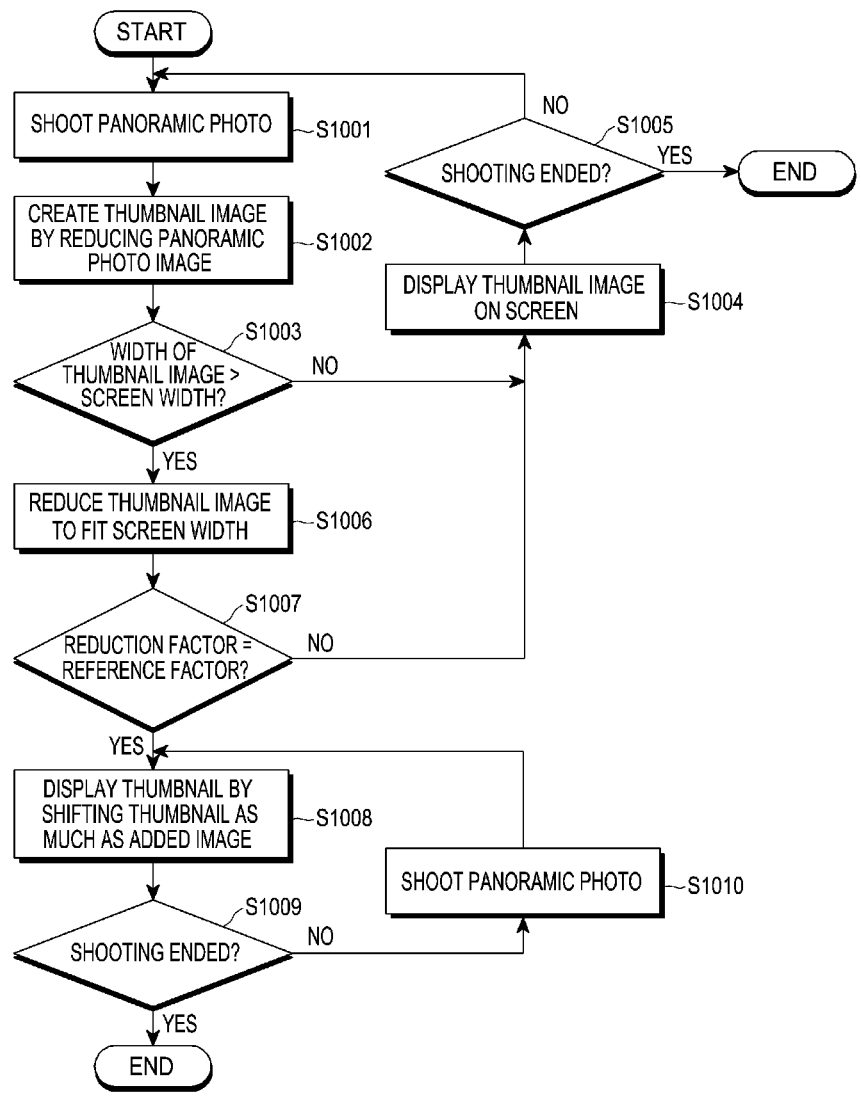
FIG. 10 is a flowchart illustrating a process of displaying a thumbnail image of a panoramic photo, according to an embodiment of the present disclosure.

FIG. 10 is a flowchart illustrating a process of displaying a thumbnail image of a panoramic photo, according to another embodiment of the present disclosure.

Referring to FIG. 10, the various embodiments of FIG. 10 results from combination of the embodiments shown in FIGS. 8 and 9. For example, if the size of the thumbnail exceeds a displayable size in the screen as the corresponding panoramic photo is increased, the thumbnail image on the whole is displayed by reducing the thumbnail image by up to a predetermined reduction factor, as described in connection with FIG. 8. If a factor by which to reduce the thumbnail image exceeds the predetermined reduction factor, the thumbnail image is not reduced further but shifted as much as a newly added part, as described in connection with FIG. 9.

Referring to FIG. 10, when panoramic photo shooting is started in the panorama photography mode in operation S1001, a panoramic photo is created from images shot as the user moves the electronic device from side to side or up and down.

A thumbnail image is created by reducing the panoramic photo by a predetermined factor (hereinafter referred to as a first factor), in operation S1002. If the width of the thumbnail image does not exceeds a displayable screen width in the screen in operation S1003, the entire thumbnail image reduced first with the first factor is displayed on the screen in operation S1004.

As the panorama shooting continues and the shooting angle increases, if the width of the thumbnail image reduced with the first factor exceeds the displayable screen width in the screen in operation S1003, the thumbnail image is further reduced by another factor (hereinafter referred to as a second factor) to fit the displayable screen width in operation S1006. The further reduced thumbnail image is displayed on the screen, in operation S1004.

In this regard, if the reduction factor by which to reduce the thumbnail image to fit the displayable screen width has reached a predetermined reference factor, which is the second factor in operation S1007, the thumbnail image is not reduced any further but is shifted as described in connection with FIG. 9. Reducing a thumbnail image by up to a certain factor and then shifting the thumbnail image if the certain factor has been reached may increase the thumbnail image's visibility. In this embodiment, if the reduction factor has reached the predetermined reference factor, which is the second factor in operation S1007, the thumbnail image is displayed by being shifted as much as the newly added image in operation S1008.

As the panorama shooting continues and the shooting angle increases, if the reduction factor of the thumbnail image has reached the predetermined reference factor in operation S1007, the thumbnail image is displayed by being shifted as much as the width of the newly added image to the thumbnail image (e.g., the width of a new image added to the right of the thumbnail image) in a certain direction (e.g., in the left direction if the user moves the portable terminal 100 from left to right to shoot the panoramic photo) in operation S1005. By doing this, the newly added image may be displayed on the screen as the panorama shooting continues in operation S1010. The aforementioned steps may be repeated until the panorama shooting ends in operation S1009 or operation S1005.

Methods according to various embodiments of the present disclosure may be implemented in program instructions which are executable by various computing means and recorded in computer-readable media. The computer-readable media may include program instructions, data files, data structures, and the like, separately or in combination. The program instructions recorded on the computer-readable media may be designed and configured specially for the present disclosure, or may be well-known to people having ordinary skill in the art of computer software. Examples of the computer readable recording medium include Read-Only Memory (ROM), Random-Access Memory (RAM), Compact Disc (CD)-ROMs, magnetic tapes, floppy disks, optical data storage devices, etc. The computer readable recording medium can also be distributed over network coupled computer systems so that the computer readable code is stored and executed in a distributed fashion. Examples of the program instructions include not only machine language codes but also high-level language codes which are executable by various computing means using an interpreter. The aforementioned hardware devices may be configured to operate as one or more software modules to carry out various embodiments of the present disclosure, and vice versa.

Screen results of implementing the aforementioned embodiments of the present disclosure in a portable terminal are described below with reference to FIGS. 11 to 13.

FIGS. 11A to 11D show a portable terminal's screens displaying thumbnail images of panoramic photos according to an embodiment of the present disclosure.

Figure 11A:
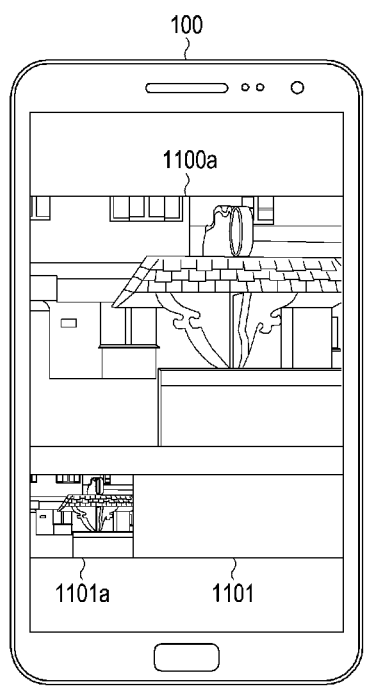
FIGS. 11A, 11B, 11C, and 11D show screens displaying thumbnail images of panoramic photos according to an embodiment of the present disclosure.

Referring to FIGS. 11A to 11D, thumbnail images may be efficiently displayed while in panoramic photo shooting. In the panorama photography mode, an image 1100a captured in real time by a lens of the camera module of the portable terminal is displayed on the screen and a thumbnail image 1101a created from a panoramic photo is displayed in a thumbnail image display area 1101 under the captured image 1100a, as shown in FIG. 11A. Compared with FIG. 5, the thumbnail image may be displayed in a relatively larger size in the beginning of the panorama photography mode. Accordingly, the user may view the thumbnail image more clearly, which might lead to an increase in usability of the thumbnail image.

Figure 11B:
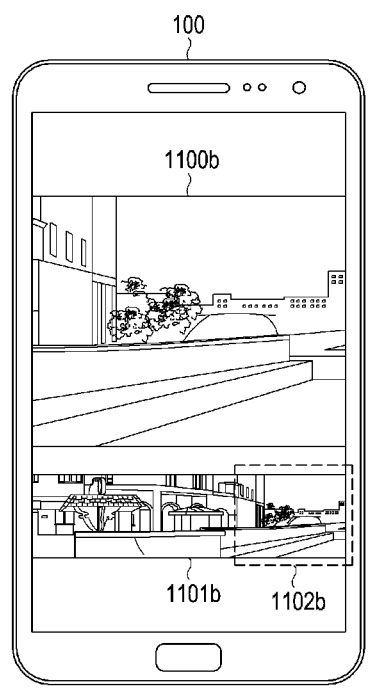

As the panorama shooting continues and the shooting angle increases, newly captured images are added to the panoramic photo and the corresponding thumbnail image continues to be expanded with the newly captured images. Referring to FIG. 11B, a relatively large thumbnail image 1101b may be displayed as far as the thumbnail image may fit in the thumbnail image display area 1101. For example, a large thumbnail image may be displayed on the screen until the shooting angle in the panorama photography mode reaches 180 degrees. A currently captured image 1100b may correspond to the right-most part 1102b of the thumbnail image 1101b on the lower side.

Figure 11C:
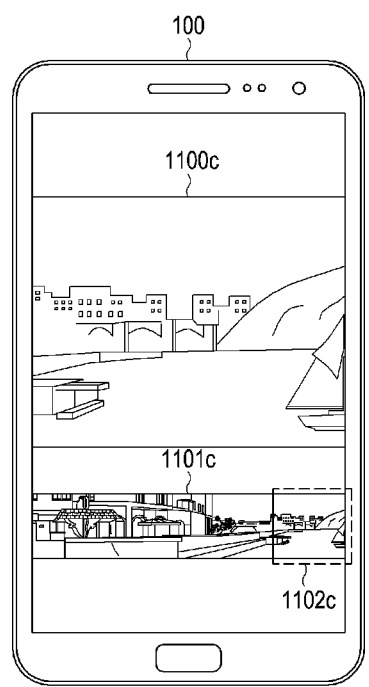

As the shooting angle increases and the thumbnail image grows larger, if the entire thumbnail image reduced with an original reduction factor no longer fits the thumbnail image display area 1101, the thumbnail image may be further reduced so that the entire thumbnail image may be displayed in the thumbnail image display area 1101, as shown in FIG. 11C. Thus, the resultant thumbnail image to be displayed may be in relatively narrower size in comparison with thumbnail images shown in FIGS. 11A and 11B. A currently captured image 1100c may correspond to the right-most part 1102c of the thumbnail image 1101c on the lower side.

Figure 11D:
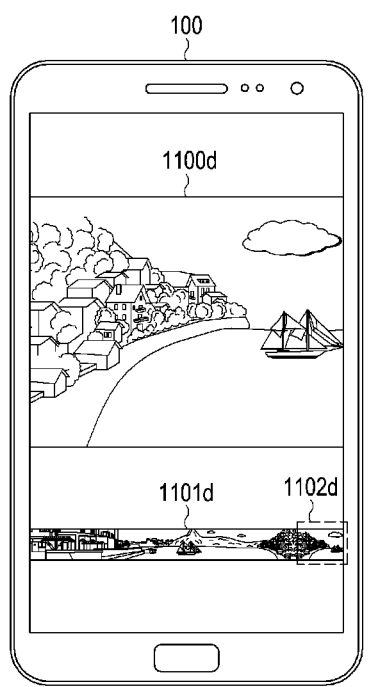

Likewise, as the shooting angle increases even more and the corresponding thumbnail grows accordingly, the thumbnail image will be even further reduced so that the entire thumbnail image may be displayed in the thumbnail image display area 1101, as shown in FIG. 11D. Thus, by the time the shooting ends, the thumbnail image to be displayed may be reduced to the smallest by a predetermined maximum reduction factor. A currently captured image 1100d may be the right-most part 1102d of the thumbnail image 1101d on the lower side.

The maximum reduction factor may be similar to or the same as the reduction factor according to the related as described in connection with FIG. 5. However, in embodiments of the present disclosure, before the shooting ends, a relatively larger thumbnail image may be provided on the screen, thus increasing usability and visibility of the thumbnail. Since most users do not perform panorama shooting to such an extent as to reach the maximum shooting angle, larger thumbnail image that is larger than the thumbnail image according to the related art may almost always be provided on the screen in embodiments of the present disclosure.

FIGS. 12A to 12D show a portable terminal's screens displaying thumbnail images of panoramic photos according to another embodiment of the present disclosure.

Figure 12A:
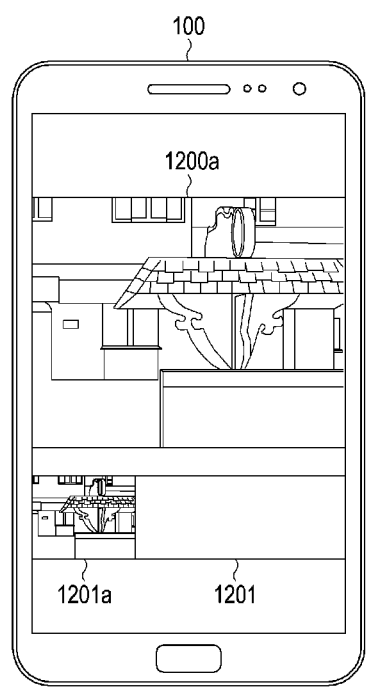
FIGS. 12A, 12B, 12C, and 12D show screens displaying thumbnail images of panoramic photos according to an embodiment of the present disclosure.

Referring to FIGS. 12A to 12D, thumbnail images may be efficiently displayed while in panorama photo shooting. In the panorama photography mode, an image 1200a captured in real time by a lens of the camera module of the portable terminal is displayed on the screen and a thumbnail image 1201a created from a panoramic photo is displayed in a thumbnail image display area 1201 under the captured image 1200a, as shown in FIG. 12A. The thumbnail image may be displayed in a relatively larger size as compared to FIG. 5. Accordingly, the user may view the thumbnail image more clearly, which might lead to an increase in usability of the thumbnail image.

Figure 12B:
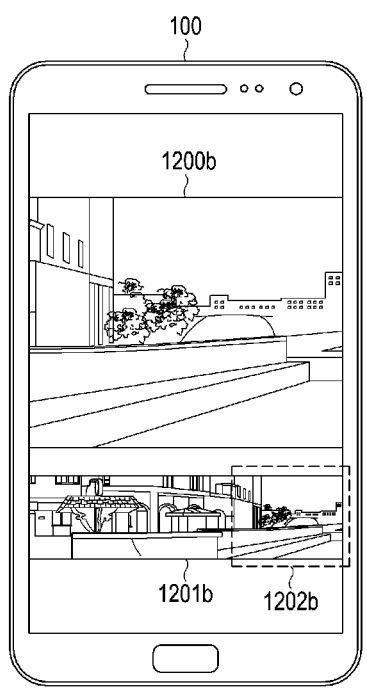

As the panorama shooting continues and the shooting angle increases, newly captured images are added to the panoramic photo and the corresponding thumbnail image continues to be expanded with the newly captured images. Referring to FIG. 12B, a relatively large thumbnail image 1201b may be displayed as far as the thumbnail image may fit in the thumbnail image display area 1201. For example, a large thumbnail image may be displayed on the screen until the shooting angle in the panorama photography mode reaches 180 degrees. A currently captured image 1200b may correspond to the right-most part 1202b of the thumbnail image 1201b on the lower side.

Figure 12C:
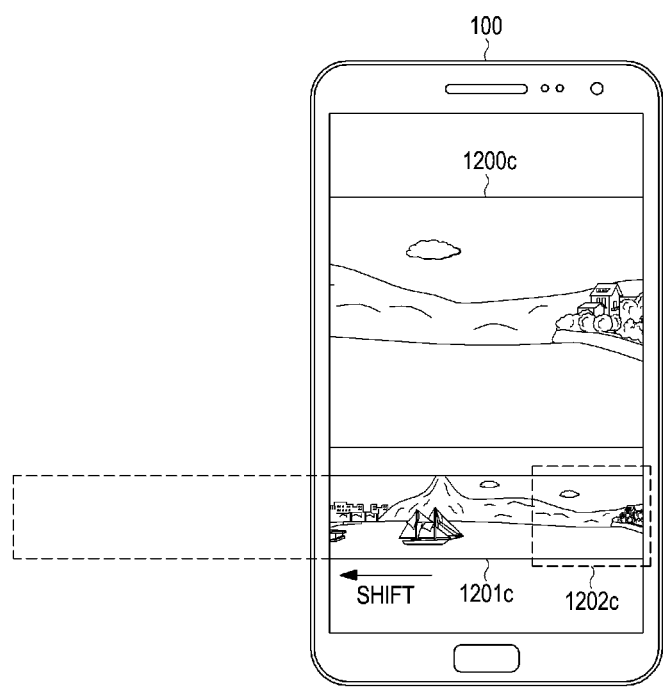

As the shooting angle increases more and the thumbnail image grows larger, if the thumbnail image reduced with an original reduction factor, on the whole, does not fit the thumbnail image display area 1201, the thumbnail image may be shifted so that the newly added image may be displayed in the thumbnail image display area 1201, as shown in FIG. 12C. Accordingly, the user may see the newly captured image-oriented thumbnail image, and may always see a larger thumbnail even if the panoramic photo continues to expand.

A currently captured image 1200c may be the right-most part 1202c of the thumbnail image 1201c on the lower side.

Figure 12D:
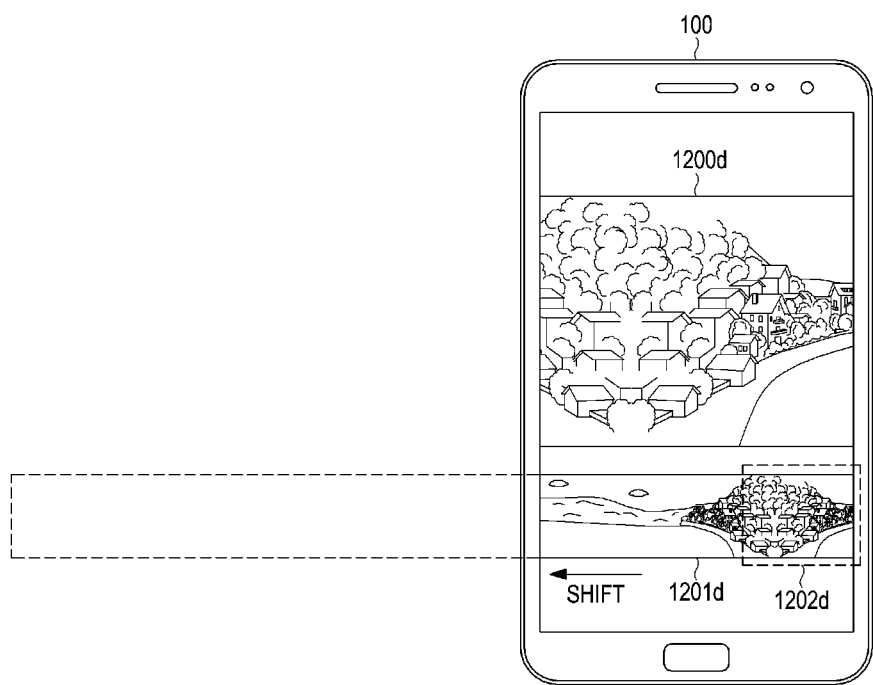

Likewise, as the shooting angle increases even more and the corresponding thumbnail grows accordingly, the thumbnail image keeps being shifted to the left so that a newly captured image may be displayed in the thumbnail image display area 1201, as shown in FIG. 12D. Thus, by the time the shooting ends, a last shot image of the panoramic photo may be displayed in a large size in the thumbnail image. A currently captured image 1200d may correspond to the right-most part 1202d of the thumbnail image 1201d on the lower side.

Referring to FIG. 12D, from beginning to end of the panorama shooting, the user may always see a relatively larger thumbnail image in comparison with the conventional thumbnail image, and such a high visibility of the thumbnail may leads to an increase in usability of the thumbnail.

FIGS. 13A to 13E show a portable terminal's screens displaying thumbnail images of panoramic photos according to another embodiment of the present disclosure.

Referring to FIGS. 13A to 13E, thumbnail images may be efficiently displayed while in panoramic photo shooting. The embodiment shown in FIGS. 13A to 13E results from s combination of the various embodiments shown in FIGS. 11A to 11D and 12A to 12D. For example, if the size of the thumbnail exceeds a displayable size in the screen as the corresponding panoramic photo is increased, the thumbnail image on the whole is displayed by reducing the thumbnail image by up to a predetermined reduction factor, as described in connection with FIGS. 11A to 11D. If a factor by which to reduce the thumbnail image has reached the predetermined reduction factor, the thumbnail image is not reduced further but shifted as much as a newly added part, as described in connection with FIGS. 12A to 12D.

Figures 13A, 13B:
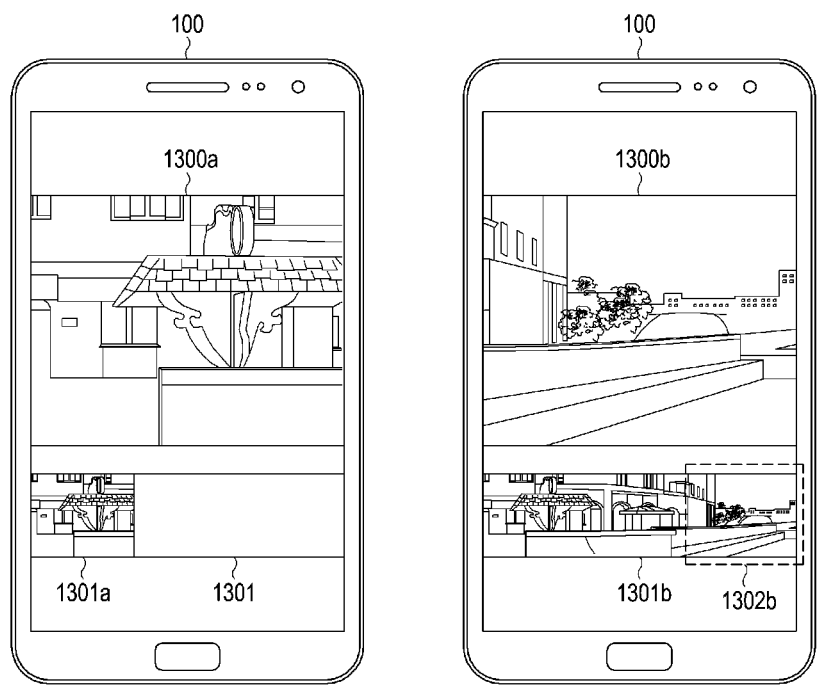
FIGS. 13A, 13B, 13C, 13D, and 13E show screens displaying thumbnail images of panoramic photos according to an embodiment of the present disclosure.

In the panorama photography mode, an image 1300a captured in real time by a lens of the camera module of the portable terminal is displayed on the screen and a thumbnail image 1301a created from a panoramic photo is displayed in a thumbnail image display area 1301 under the captured image 1300a, as shown in FIG. 13A. Compared with FIG. 5, the thumbnail image may be displayed in a relatively larger size in the beginning of the panorama photography mode. Accordingly, the user may view the thumbnail image more clearly, which might lead to an increase in usability of the thumbnail image.

As the panorama shooting continues and the shooting angle increases, newly captured images are added to the panoramic photo and the corresponding thumbnail image continues to be expanded with the newly captured images. Referring to FIG. 13B, a relatively large thumbnail image 1301b may be displayed as far as the thumbnail image may fit in the thumbnail image display area 1301. For example, a large thumbnail image may be displayed on the screen until the shooting angle in the panorama photography mode reaches 180 degrees. A currently captured image 1300b may be the right-most part 1302b of the thumbnail image 1301b on the lower side.

Figure 13C:
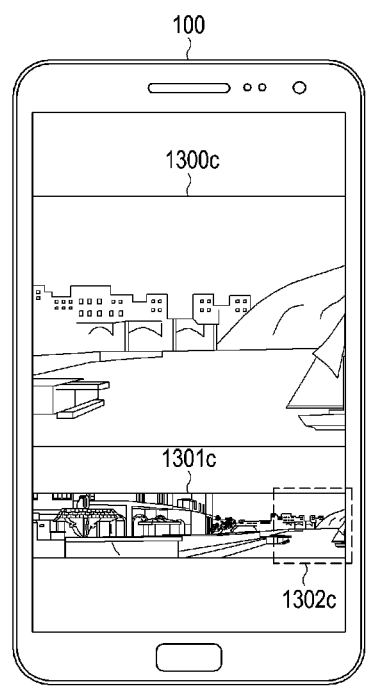

As the shooting angle increases and the thumbnail image grows larger, if the entire thumbnail image reduced with an original reduction factor does not fit the thumbnail image display area 1301, the thumbnail image may be further reduced so that the entire thumbnail image may be displayed in the thumbnail image display area 1301, as shown in FIG. 13C. Thus, the resultant thumbnail image to be displayed may be in relatively narrower size in comparison with thumbnail images shown in FIGS. 13A and 13B. A currently captured image 1300c may correspond to the right-most part 1302c of the thumbnail image 1301c on the lower side.

As the shooting angle increases even more and the corresponding thumbnail grows accordingly, the thumbnail image needs to be further reduced. In this regard, the reduction factor by which to reduce the thumbnail image has reached a predetermined reference factor, the thumbnail is not further reduced but shifted as described in connection with FIGS. 12A to 12D.

Figure 13D:
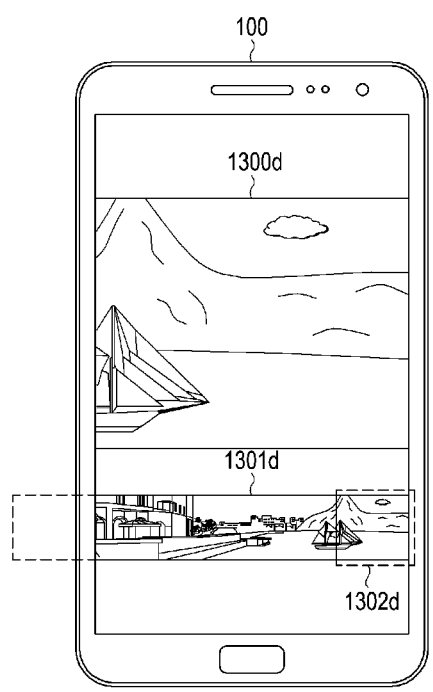

As the panorama shooting continues and the shooting angle increases more, if the reduction factor by which to reduce the thumbnail image has reached the predetermined reference factor, the thumbnail image may be shifted to the left so that the newly added image may be displayed in the thumbnail image display area 1301, as shown in FIG. 13D. Then the user may see the newly captured image-oriented thumbnail image, and may always see larger thumbnail even if the panoramic photo continues to expand. A currently captured image 1300d may be the right-most part 1302d of the thumbnail image 1301d on the lower side.

Figure 13E:
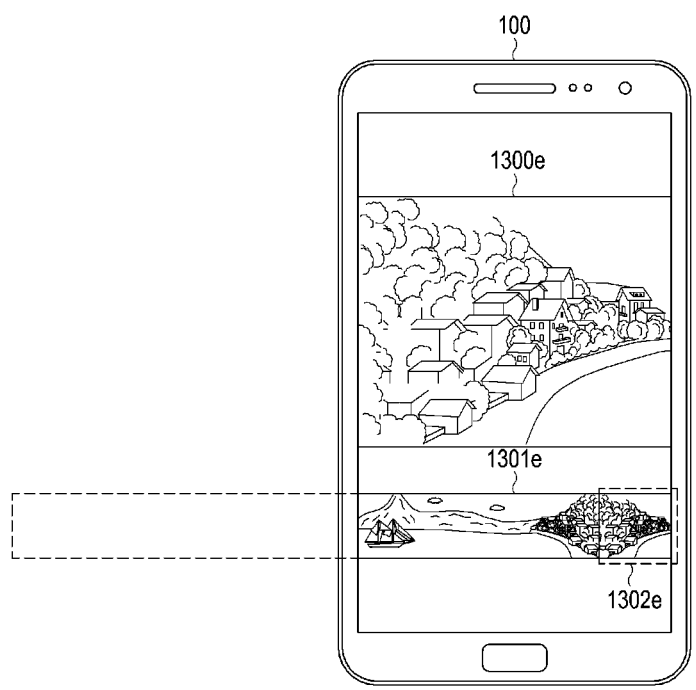

Likewise, as the shooting angle increases even more and the corresponding thumbnail grows accordingly, the thumbnail image keeps being shifted to the left so that a newly captured image may be displayed in the thumbnail image display area 1301, as shown in FIG. 13E. Thus, by the time the shooting ends, a last shot image of the panoramic photo may be displayed in a large size in the thumbnail image. A currently captured image 1300e may correspond to the right-most part 1302e of the thumbnail image 1301e on the lower side.

Referring to FIG. 13E, from beginning to end of the panorama shooting, the user may always see a relatively larger thumbnail image in comparison with the conventional thumbnail image, and such a high visibility of the thumbnail may leads to an increase in usability of the thumbnail.

In an embodiment of the present disclosure, in the panorama photography mode of an electronic device, such as a camera, smartphone, and the like, the reduction factor by which to reduce the thumbnail image may be adjusted according to the size of the currently created panoramic photo image to enrich the User Experience (UX).

In another embodiment of the present disclosure, in the panorama photography mode of an electronic device, such as a camera, smartphone, and the like, as the size of the currently created panoramic photo image increases, the corresponding thumbnail image may be displayed by being shifted while maintaining its size to enrich the user experience.

In another embodiment of the present disclosure, in the panorama photography mode of an electronic device, such as a camera, smartphone, and the like, as the size of the currently created panoramic photo image increases, the reduction factor by which to reduce the thumbnail image may be adjusted to an optimum reduction factor according to the size of the currently created panoramic photo image to enrich the user experience.

In an embodiment of the present disclosure, in viewing panoramic photos in an electronic device, such as a camera, smartphone, and the like, the reduction factor by which to reduce the thumbnail image may be adjusted to an optimum reduction factor according to the size of the currently created panoramic photo image to enrich the user experience.

Several embodiments have been described in connection with mobile communication terminals, but a person of ordinary skill in the art will understand and appreciate that various modifications can be made without departing the scope of the present disclosure. Thus, it will be apparent to those ordinary skilled in the art that the disclosure is not limited to the embodiments described, which have been provided only for illustrative purposes.

Although the previous described that a screen of a particular application is configured to be a screen requested by a customer server when the particular application is to be re-installed, the screen of the particular application may be configured to be the screen requested by the customer server even when the particular application is to be updated.

While the present disclosure has been shown and described with reference to various embodiments thereof, it will be understood by those skilled in the art that various changes in form and details may be made therein without departing form the spirit and scope of the present disclosure as defined by the appended claims and their equivalents.

What is claimed is:

1. An electronic device for displaying a thumbnail image of a panoramic photo, the electronic device comprising:
   a camera configured to capture a photo in a panorama photography mode;
   a processor configured to create a thumbnail image by reducing the panoramic photo shot by the camera by a first aspect ratio; and
   a display configured to display the thumbnail image on a screen,
   wherein the processor is further configured to:
      if a width of the thumbnail image, after being reduced by the first aspect ratio exceeds a displayable screen range of the display as a shooting angle of the panoramic photo shot by the camera increases, update the thumbnail by further reducing the thumbnail image by a second aspect ratio such that a width of the updated thumbnail image is fitted in a displayable screen range of the display, wherein the second aspect ratio is less than a reference ratio, and
      control the display to display the updated thumbnail image on the screen.

2. The electronic device of claim 1, wherein the display displays the panoramic photo on the screen.

3. The electronic device of claim 1, wherein the display displays the thumbnail image having a wide aspect ratio on an upper or lower side of the screen.

4. The electronic device of claim 1, wherein the display displays the thumbnail image having a long aspect ratio on a left or right side of the screen.

5. The electronic device of claim 1, wherein the processor controls the thumbnail image to be updated at a predetermined cycle.

6. The electronic device of claim 1, wherein the display displays a thumbnail image corresponding to a panorama photo selected from among panorama photos stored in a storage as being reduced by the second aspect ratio.

7. An electronic device for displaying a thumbnail image of a panoramic photo, the electronic device comprising:
   a camera configured to capture a photo in a panorama photography mode;
   a processor configured to create a thumbnail image by reducing the panoramic photo shot by the camera by a first aspect ratio; and
   a display configured to display the thumbnail image on a screen,
   wherein the processor is further configured to:
      control the thumbnail image to be shifted in an opposite direction of a shooting direction if, after the reducing of the panoramic photo by the first aspect ratio, a width of the thumbnail image exceeds a displayable screen range of the display as a shooting angle of the panoramic photo shot by the camera increases such that an image added as the shooting angle increases is further displayed on the screen.

8. The electronic device of claim 7, wherein the display further displays the panoramic photo on the screen.

9. The electronic device of claim 7, wherein the display displays the thumbnail image having a wide aspect ratio on an upper or lower side of the screen.

10. The electronic device of claim 7, wherein the display displays the thumbnail image having a long aspect ratio on a left or right side of the screen.

11. The electronic device of claim 7, wherein the processor controls the thumbnail image to be updated at a predetermined cycle.

12. An electronic device for displaying a thumbnail image of a panoramic photo, the electronic device comprising:
    a camera configured to capture a photo in a panorama photography mode;
    a processor configured to create a thumbnail image by reducing the panoramic photo shot by the camera by a first aspect ratio; and
    a display configured to display the thumbnail image on a screen,
    wherein the processor is further configured to:
       control, after reducing the thumbnail image by the first aspect ratio, the thumbnail image to be updated by further reducing the thumbnail image to fit in a displayable screen range of the display if a width of the thumbnail image exceeds the displayable screen range as a shooting angle of the panoramic photo shot by the camera increases, and
       control the thumbnail image to be shifted in an opposite direction of a shooting direction if an aspect ratio, by which to further reduce the thumbnail image, exceeds a reference aspect ratio as the shooting angle continues to increase, such that an image added as the shooting angle increases is further displayed on the screen.

13. The electronic device of claim 12, wherein the display further displays the panoramic photo on the screen.

14. The electronic device of claim 12, wherein the display displays the thumbnail image having a wide aspect ratio on an upper or lower side of the screen.

15. The electronic device of claim 12, wherein the display displays the thumbnail image having a long aspect ratio on a left or right side of the screen.

16. The electronic device of claim 12, wherein the processor controls the thumbnail image to be updated at a predetermined cycle.

17. A method for displaying a thumbnail image of a panoramic photo, the method comprising:
  capturing a photo with a camera in a panorama photography mode;
  creating a thumbnail image by reducing the panoramic photo shot by the camera by a first aspect ratio;
  displaying the thumbnail image on a screen;
  if a width of the thumbnail image exceeds a displayable screen range of the display as a shooting angle of the panoramic photo shot by the camera increases after the thumbnail image is reduced by the first aspect ratio, updating the thumbnail image by further reducing the thumbnail image by a second aspect ratio such that a width of the updated thumbnail image is fitted in a displayable screen range of the display, wherein the second aspect ratio is less than a reference ratio; and
  displaying the updated thumbnail image on the screen.

18. The method of claim 17, further comprising:
  displaying the panoramic photo on the screen.

19. The method of claim 17, wherein the thumbnail image is displayed to have a wide aspect ratio on an upper or lower side of the screen.

20. The method of claim 17, wherein the thumbnail image is displayed to have a long aspect ratio on a left or right side of the screen.

21. The method of claim 17, wherein the thumbnail image is updated at a predetermined cycle.

22. The method of claim 17, further comprising:
  displaying a thumbnail image corresponding to a panorama photo selected from among panorama photos stored in a storage as being reduced by the second aspect ratio.

23. A method for displaying a thumbnail image of a panoramic photo, the method comprising:
  capturing a photo with a camera in a panorama photography mode;
  creating a thumbnail image by reducing the panoramic photo shot by the camera by a first aspect ratio;
  displaying the thumbnail image on a screen; and
  shifting the thumbnail image in an opposite direction of a shooting direction if, after the reducing of the panoramic photo shot by the first aspect ratio, a width of the thumbnail image exceeds a displayable screen range of the screen as a shooting angle of the panoramic photo shot by the camera increases such that an image added as the shooting angle increases is further displayed on the screen.

24. The method of claim 23, further comprising:
  displaying the panoramic photo on the screen.

25. The method of claim 23, wherein the thumbnail image is displayed to have a wide aspect ratio on an upper or lower side of the screen.

26. The method of claim 23, wherein the thumbnail image is displayed to have a long aspect ratio on a left or right side of the screen.

27. The method of claim 23, wherein the thumbnail image is updated at a predetermined cycle.

28. A method for displaying a thumbnail of a panoramic photo, the method comprising:
  capturing a photo with a camera in a panorama photography mode;
  creating a thumbnail image by reducing the panoramic photo shot by the camera by a first aspect ratio;
  displaying the thumbnail image on a screen;
  updating, after reducing the thumbnail image by the first aspect ratio, the thumbnail image by further reducing the thumbnail image to fit in a displayable screen range of the display if a width of the thumbnail image exceeds the displayable screen range as a shooting angle of the panoramic photo shot by the camera increases;
  displaying the further reduced thumbnail image on the screen; and
  shifting the thumbnail image in an opposite direction of a shooting direction if an aspect ratio by which to further reduce the thumbnail image exceeds a reference aspect ratio as the shooting angle continues to increase, such that an image added as the shooting angle increases is further displayed on the screen.

29. The method of claim 28, further comprising:
  displaying the panoramic photo on the screen.

30. The method of claim 28, wherein the thumbnail image is displayed to have a wide aspect ratio on an upper or lower side of the screen.

31. The method of claim 28, wherein the thumbnail image is displayed to have a long aspect ratio on a left or right side of the screen.

32. The method of claim 28, wherein the thumbnail image is updated at a predetermined cycle.

33. A computer-readable recording medium having a program embodied thereon for carrying out the method claim 17.

* * * * *